C. M. CLARK.
COLLAPSIBLE WHEEL.
APPLICATION FILED OCT. 10, 1917.
1,308,660.
Patented July 1, 1919.
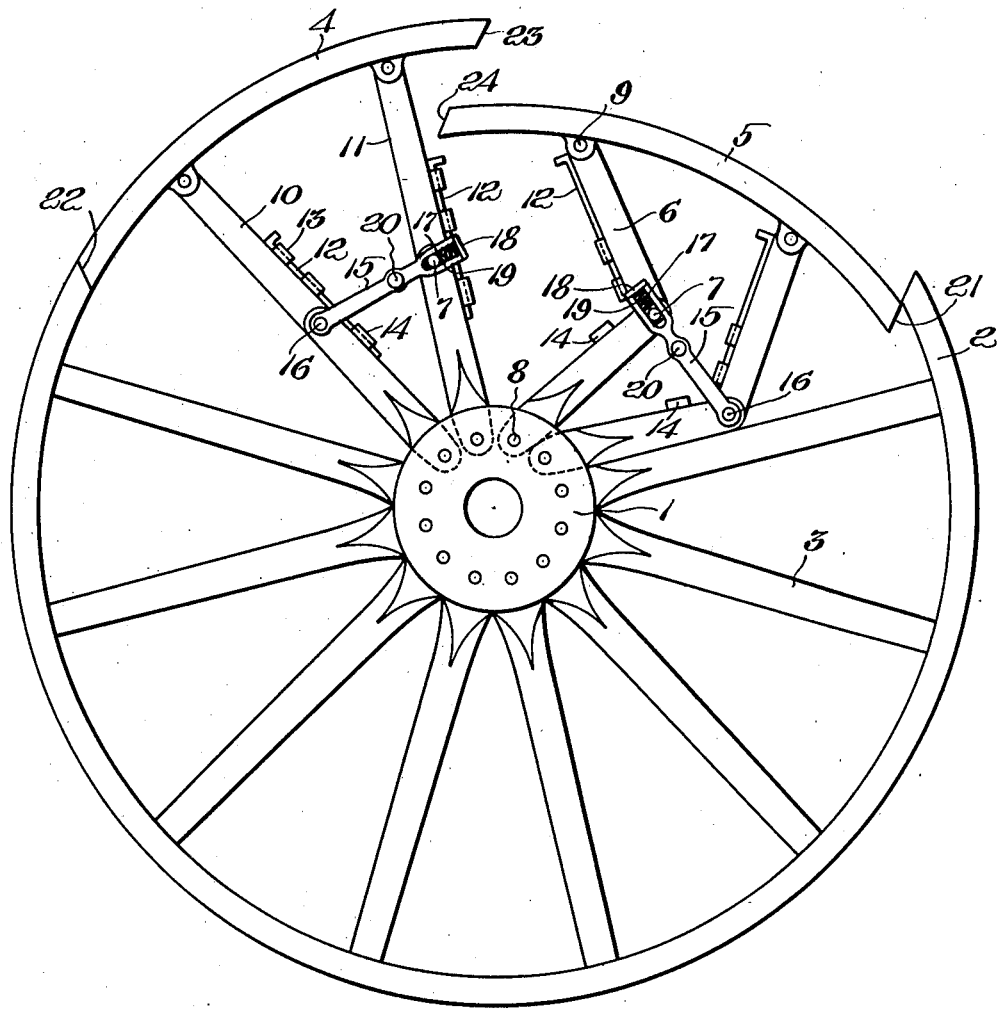
Inventor:
Charles Motley Clark,
by Roberts Roberts Cushman
His Attorneys.

UNITED STATES PATENT OFFICE.

CHARLES MOTLEY CLARK, OF BOSTON, MASSACHUSETTS.

COLLAPSIBLE WHEEL.

1,308,660.  Specification of Letters Patent.  Patented July 1, 1919.

Application filed October 10, 1917. Serial No. 195,855.

*To all whom it may concern:*

Be it known that I, CHARLES MOTLEY CLARK, a citizen of the United States of America, and resident of Boston, in the county of Suffolk and State of Massachusetts, have invented new and useful Improvements in Collapsible Wheels, of which the following is a specification.

This invention relates to collapsible wheels and more particularly to automobile wheels adapted to permit the mounting and demounting of elastic tires thereupon and therefrom.

The principal objects of the invention are to provide a wheel adapted to permit the ready mounting and demounting of elastic tires, which can be readily collapsed so as to reduce the peripheral extent of the wheel, which can readily be again extended to normal condition without the use of undue power, and which is rigid and substantial in character when in extended and normal condition.

Other objects of the invention will be apparent from the following description and the accompanying drawings in which the figure is a side elevation of one embodiment of my invention.

The particular species of the invention chosen for the purpose of illustration comprises, in general, a hub 1, a felly 2 and a series of spokes 3 extending between the hub and felly. One or more sections of the felly are detachably associated with the main portion of the felly, and in the preferred form of my invention illustrated in the drawings I have shown two such sections 4 and 5.

The invention consists in a novel mode of collapsibly supporting the detachable sections so that the sections may be drawn inwardly from the normal peripheral region of the felly, thereby to reduce the peripheral extent of the felly to such extent that a tire may be moved over the felly, and my preferred construction for attaining this end will now be described.

Between each of the detachable sections of the felly and the hub are disposed one or more collapsible spokes, preferably two as illustrated. The preferred means for collapsing the spokes comprises dividing each spoke in its central region into two portions and joining the two portions together by a pivotal connection. For example, spoke 6 is articulated at 7. In order to permit the detachable felly section to be moved inwardly, either one or both portions of each spoke are pivotally connected to the hub and felly sections respectively. In the drawings I have illustrated both portions of a spoke as being pivotally connected at their opposite ends, the inner portion being pivotally mounted in the hub 1 as at 8, and the outer portion being pivotally connected to the felly section as at 9.

When the collapsible spokes are in normal position, as illustrated at 10 and 11, the felly section is maintained in continuity with the main portion of the felly. Suitable means for maintaining the collapsible spokes in extended position comprises bolts 12 sliding in guides 13 and 14 on the respective portions of the spokes and extending across the pivoted sections of the spokes when in operative position. In order to collapse the wheel the bolts 12 are pulled outwardly into the position shown in connection with the section 5.

In order to strengthen and brace the collapsible spokes and to afford convenient means for collapsing the detachable sections of the felly and for maintaining the sections in suitable position while detached from the main portion of the felly, I provide, according to the present invention, connections between the spokes of each of the pairs of spokes associated with the respective detachable sections, and I preferably make this connection extensible (or compressible) to compensate for the varying distance between the said pivots as the pairs of spokes are collapsed or extended. The preferred means for this purpose comprises a link 15 pivotally mounted on the pivot pin 16 of one spoke of the pair and having a slot 17 fitting over the pivot pin of the other spoke of the pair, a cap 18 being suitably mounted over the end of the slot 17 to confine the spring 19 which extends between the cap 18 and the pivot pin 7. A handle 20 is preferably provided on the outer side of the member 15 to facilitate the operation of the mechanism.

The distance between the pivoted pins 7 and 16 of the spokes of each pair is greater when the spokes are in extended position than when they are in collapsed position, so that the spring 19 is under greater compression when the spokes are in extended position. Thus, when the locking bolts 12 are withdrawn to permit the collapse of the spokes, the springs 19 function to collapse the spokes or at least to assist in collapsing them. As the spokes are collapsed the pin 7 moves longitudinally of the slot 17. The handle 20 serves to collapse or extend the spokes, and the connecting member 15 serves to hold the sections in position while they are collapsed, that is, the connecting members prevent the spokes from entirely collapsing.

One of the features of the invention resides in the association of the collapsible sections 4 and 5 with each other and with the main portion of the felly. The end faces 21 and 22 of the detachable sections which abut against the ends of the main portion of the felly are oblique and they slope in opposite directions, the slope being such that the detachable sections may move inwardly but not outwardly. The two ends 23 and 24 are also preferably sloping, but the slope of these ends may be either in the direction of the end 22, as shown, or in the direction of the end 21. When the ends 23 and 24 are sloped as shown, the section 5 must be collapsed first to permit the collapse of the other section 4.

It will be understood that many modifications of my improved wheel will be suggested to those skilled in the art by the present disclosure, and I do not therefore desire to be limited to the precise construction illustrated in the drawings. For example, in one aspect my invention is of utility if only one detachable felly section be provided. Moreover, the connecting link between the spokes of each pair may be considerably modified and indeed may be wholly omitted in so far as certain phases of the invention are concerned.

I claim:

1. A collapsible wheel comprising a hub, a felly having a section detachable from the remaining portions thereof, an articulate spoke extending between said felly section and hub, and means for pivotally connecting the spoke to the felly section and to the hub respectively, whereby the felly section may be drawn inwardly away from the remaining portions of the felly.

2. A collapsible wheel comprising a hub, a felly having a section detachable from the remaining portions thereof, a plurality of spokes extending between the hub and said felly section, the spokes being pivotally connected to said felly section and being jointed intermediate their ends so that said felly section may be drawn inwardly away from the remaining portions of the felly.

3. A collapsible wheel comprising a hub, a felly having a section detachable from the remaining portions thereof, a plurality of spokes extending between the hub and said felly section, the spokes being pivotally connected to said felly section and being jointed intermediate their ends, and connecting means extending between the spokes in the region of the joints.

4. A collapsible wheel comprising a hub, a felly having a section detachable from the remaining portions thereof, a plurality of spokes extending between the hub and said felly section, the spokes being pivotally connected to said hub and felly section and being jointed intermediate their ends so that said felly section may be drawn inwardly away from the remaining portions of the felly by collapsing the spokes about the joints, and connecting means extending between the spokes in the region of the joints, the connecting means being extensible so as to compensate for the varying distance between the joints as the spokes are collapsed.

5. A collapsible wheel comprising a hub, a felly having a plurality of adjacent sections detachable from the remaining portion thereof, a collapsible spoke extending between each felly section and the hub, the end faces of the felly being oblique to the periphery of the felly and the oblique ends of the felly sections which abut the remaining portion of the felly sloping inwardly away from the region of said felly section so that the felly sections may move inwardly when the spokes are collapsed.

6. A collapsible wheel comprising a hub, a felly having a section detachable from the remaining portion thereof, and a collapsible spoke extending between said section and the hub, the end faces of said section being oblique to the periphery of the felly and the oblique end faces sloping inwardly away from the region of said felly section so that said section may move inwardly away from the remaining portion of the felly when the spoke is collapsed.

Signed by me at Boston, Massachusetts, this tenth day of April, 1918.

CHARLES MOTLEY CLARK.